(12) United States Patent
Vaccari

(10) Patent No.: US 12,434,442 B2
(45) Date of Patent: Oct. 7, 2025

(54) MACHINE FOR WELDING PROFILED ELEMENTS MADE OF PLASTIC MATERIAL

(71) Applicant: Graf Synergy S.r.l., Nonantola (IT)

(72) Inventor: Andrea Vaccari, Nonantola (IT)

(73) Assignee: Graf Synergy S.r.l., Nonantola (IT)

( * ) Notice: Subject to any disclaimer, the term of this patent is extended or adjusted under 35 U.S.C. 154(b) by 106 days.

(21) Appl. No.: 18/039,285

(22) PCT Filed: Nov. 29, 2021

(86) PCT No.: PCT/IB2021/061043
§ 371 (c)(1),
(2) Date: May 30, 2023

(87) PCT Pub. No.: WO2022/113029
PCT Pub. Date: Jun. 2, 2022

(65) Prior Publication Data
US 2024/0300188 A1 Sep. 12, 2024

(30) Foreign Application Priority Data
Nov. 30, 2020 (IT) .................. 102020000029048

(51) Int. Cl.
*B29C 65/20* (2006.01)
*B29C 65/78* (2006.01)
*B29L 31/00* (2006.01)

(52) U.S. Cl.
CPC ...... *B29C 65/2076* (2013.01); *B29C 65/2015* (2013.01); *B29C 65/203* (2013.01); *B29C 65/7841* (2013.01); *B29L 2031/005* (2013.01)

(58) Field of Classification Search
CPC .................. B29C 65/2015; B29C 65/2076
See application file for complete search history.

(56) References Cited

U.S. PATENT DOCUMENTS 3,013,925 A * 12/1961 Larsen ................ B29C 66/5221
156/499
4,752,350 A * 6/1988 Schuster ............. B29C 65/7841
156/499

(Continued)

FOREIGN PATENT DOCUMENTS

| IT | MO20120057 | 9/2013 |
| WO | WO 2022/113029 | 6/2022 |

OTHER PUBLICATIONS

International Search Report and the Written Opinion Dated Mar. 18, 2022 From the International Searching Authority Re. Application No. PCT/IB2021/061043. (8 Pages).

*Primary Examiner* — Jeffry H Aftergut

(57) ABSTRACT

The machine (1) comprises at least one main welding device (3) of a first profiled element (4) and a second profiled element (5) which extend along their respective longitudinal directions and are each provided with at least one extremal area to be welded (6), the main welding device (3) comprising:
main retaining means (18, 19) of the profiled elements (4, 5);
main heating means (20) adapted to heat the extremal areas to be welded (6);
main displacement means (21) of the main retaining means (18, 19) adapted to displace the profiled elements (4, 5) between a mutual spacing away position and a mutual approaching position;
wherein the main heating means (20) comprise two heating plates (27), each of which can be placed in contact with a respective extremal area to be welded (6) and arranged substantially parallel to each other at a predefined distance to define a free volume (V) positioned between them.

16 Claims, 13 Drawing Sheets

(56) References Cited

U.S. PATENT DOCUMENTS

| | | | | |
|---|---|---|---|---|
| 5,006,198 | A * | 4/1991 | Pasquini | B29C 65/7841 |
| | | | | 156/304.6 |
| 5,902,447 | A * | 5/1999 | Johnson | B29C 65/1432 |
| | | | | 156/499 |
| 6,875,305 | B2 * | 4/2005 | Tesch | B29C 66/52431 |
| | | | | 156/304.6 |
| 7,748,427 | B2 * | 7/2010 | Maruyama | B29C 66/5243 |
| | | | | 156/499 |
| 9,969,128 | B2 * | 5/2018 | Vaccari | B29C 66/22 |

* cited by examiner

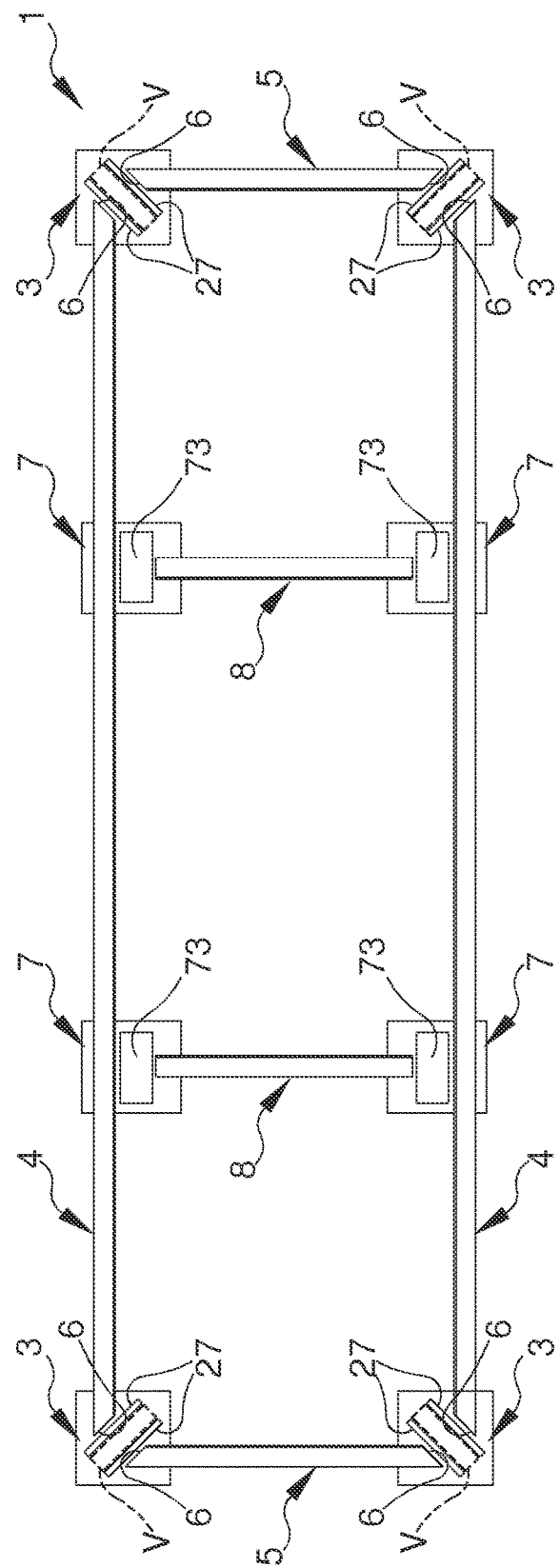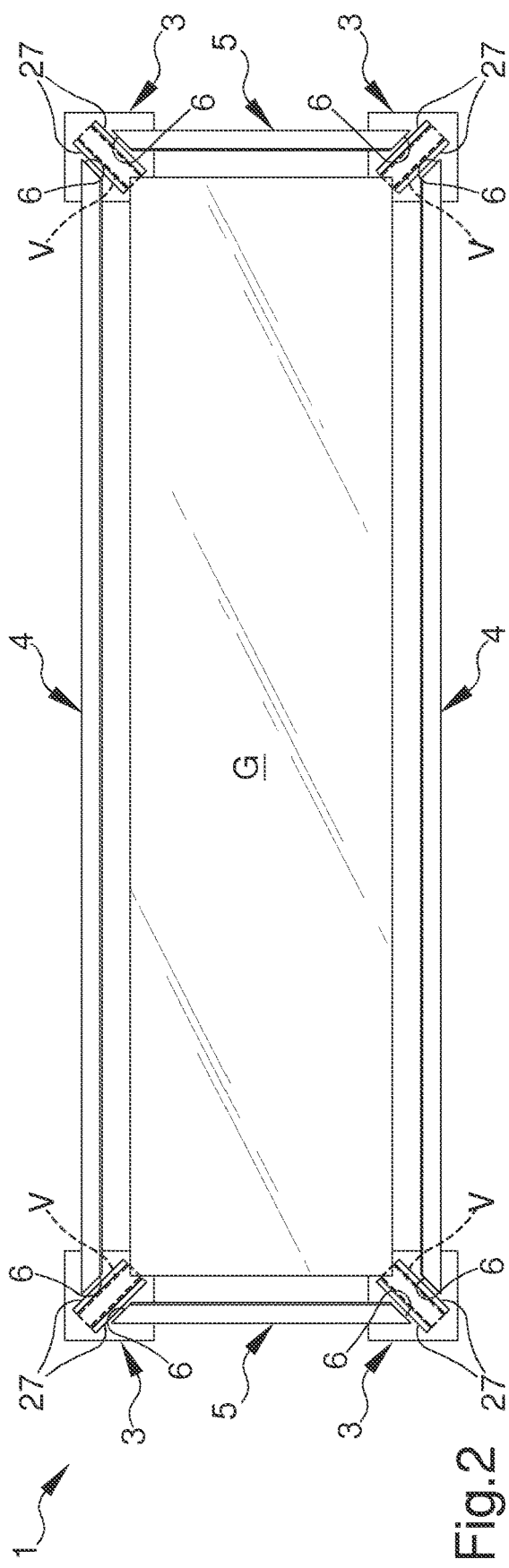

MACHINE FOR WELDING PROFILED ELEMENTS MADE OF PLASTIC MATERIAL

RELATED APPLICATIONS

This application is a National Phase of PCT Patent Application No. PCT/IB2021/061043 having International filing date of Nov. 29, 2021, which claims the benefit of priority of Italian Patent Application No. 102020000029048 filed on Nov. 30, 2020. The contents of the above applications are all incorporated by reference as if fully set forth herein in their entirety.

FIELD AND BACKGROUND OF THE INVENTION

The present invention relates to a machine for welding profiled elements made of plastic material.

In the building sector, machines are known for the production of windows/doors made of plastic material, in particular PVC.

These windows and doors consist of a series of profiled elements, made of plastic material, usually formed by extrusion or similar techniques, which are welded together in order to create a frame, inside which there is a central panel made of glass or other material, to obtain a door or a window.

The profiled elements extend along respective longitudinal directions and each is provided with at least one extremal area to be welded.

The area to be welded is a surface of the profiled element through which the profiled element itself is welded to another profiled element.

The extremal area to be welded is transverse to the relevant longitudinal direction and is obtained by cutting the profiled element at one end along a direction generally inclined by an angle of 45° with respect to the longitudinal direction.

The machines of known type comprise a plurality of welding devices adapted to machine and weld the areas to be welded of the profiled elements to each other.

In particular, the machines of known type do have a supporting base on which the welding devices can be moved depending on the dimensions of the profiled elements and of the position of the areas to be welded defined thereon.

Generally speaking, the known welding devices comprise:
  retaining means adapted to retain the profiled elements with the areas to be welded facing each other;
  heating means which are movable to be placed between the areas to be welded and to heat them until at least partial melting of the plastic material; and
  movement means of the retaining means adapted to displace the profiled elements in mutual approach to bring the heated areas to be welded in contact with each other.

In this way, the partly melted areas to be welded come into intimate contact with each other and the plastic material, after being cooled, hardens again thus keeping the profiled elements together.

It is easy to appreciate, therefore, that these operations must be carried out extremely quickly in order to optimize the welding process and give the windows and doors a valuable aesthetic effect.

In fact, excessive cooling of the plastic material, before joining the areas to be welded, can compromise the effectiveness of the welding operation and even the aesthetics of the windows and doors.

A first known type of machine for welding profiled elements made of plastic material is described in WO2017072660A1.

In particular, the machine described by WO2017072660A1 can be used in the manufacture of windows and doors directly provided with a central panel coming out of the machine itself and, in addition to the welding devices, it also comprises means for assembling the central panel.

The windows and doors are made by welding the profiled elements together and, at the same time, by inserting the central panel between them.

In detail, the means for assembling the central panel consist of a support for the central panel, placed between the welding devices, so that the central panel itself is surrounded by the profiled elements during welding.

In such machines, the heating means are composed of a heating plate, of the type of an electrical resistance plate, which is moved with respect to the profiled elements.

These machines are susceptible to improvements.

In fact, the presence of the central panel at the profiled elements is an obstacle to the movement of the heating plate, which is not able to completely place itself between the extremal areas to be welded.

In order to correctly carry out the welding operations, the central panel is positioned between the profiled elements after heating the extremal areas to be welded. Nevertheless, this operation, although being carried out extremely quickly, can lead to excessive cooling of the plastic material with the above mentioned risks of compromising the effectiveness of the welding and the aesthetic effect of the window/door.

This would slow down the welding operations with the consequent problems described above.

For this purpose, the machine described by WO2017072660A1 further describes the possibility of using a heating plate provided with a chamfer at least partly complementary to the cross-section of the central panel and placeable so as to embrace the central panel itself.

In this way, it is possible to place the central panel between the profiled elements during the heating phase, further reducing the welding time.

However, the chamfer must be made specifically according to the dimensions of the central panel, so it is necessary to replace the heating plate for each type of work to be carried out.

A second type of machines of known type can be used for the production of windows/doors provided with crosspieces.

In such a case, the machine comprises main welding devices, provided with the heating plate, adapted to weld together a plurality of perimeter profiled elements, in order to make the frame, and intermediate welding devices adapted to weld at least one transverse profiled element to the perimeter profiled elements.

However, this type of machine also has some drawbacks.

In fact, the intermediate welding devices are provided with a heating unit which is shaped to fit the inner side face of the perimeter profiled element, on which an intermediate welding area is defined.

It should be noted, in fact that, while the extremal areas to be welded lie on a substantially flat surface, the intermediate areas to be welded lie on an extremely irregular surface, provided with recesses and projections, the depth of which varies according to the type of profiled element.

For this reason, the heating unit is, generally, provided with a large size in order to be able to effectively contact both the transverse and the perimeter profiled elements, regardless of the size of the latter.

The size of the heating unit also affects the geometry of the main welding devices and, in particular, results in a corresponding spacing between the extremal welding areas of the perimeter profiled elements which must be heated at the same time.

The heating plate of the main welding device should, therefore, be made with a high thickness, such as to allow contact by the extremal areas to be welded.

This would result in an increased overall dimensions compared to the additional components of the main welding device, in addition to the fact that the increased size of the heating plate means greater difficulty in reaching the required temperature, greater energy consumption in maintaining it at that temperature and a longer cooling time.

This possible solution, in addition to lengthening the operating times, also involves a significant increase in the overall dimensions of the main welding device and, consequently, of the machine.

SUMMARY OF THE INVENTION

The main aim of the present invention is to devise a machine for welding profiled elements made of plastic material, which allows reducing the time required to manufacture windows/doors, especially complex windows/doors, i.e. already provided with the central panel coming out of the machine and/or with one or more transverse profiled elements.

Another object of the present invention is to devise a machine for welding profiled elements made of plastic material, which is provided with small dimensions and which is structurally simple.

A further object of the present invention is to devise a machine for welding profiled elements made of plastic material, which allows the above-mentioned drawbacks of the prior art to be overcome, within the scope of a simple, rational, easy and effective to use as well as affordable solution.

The above-mentioned objects are achieved by the present machine for welding profiled elements made of plastic material having the characteristics of claim 1.

BRIEF DESCRIPTION OF THE SEVERAL VIEWS OF THE DRAWINGS

Other characteristics and advantages of the present invention will become more apparent from the description of a preferred, but not exclusive, embodiment of a machine for welding profiled elements made of plastic material, illustrated by way of an indicative, yet non-limiting example, in the accompanying tables of drawings wherein:

FIGS. 1 and 2 are schematic representations of the machine for welding profiled elements according to the invention for the production of windows/doors already provided with transverse profiled elements or with the central panel, respectively, coming out of the machine;

DESCRIPTION OF SPECIFIC EMBODIMENTS OF THE INVENTION

Figure 3:
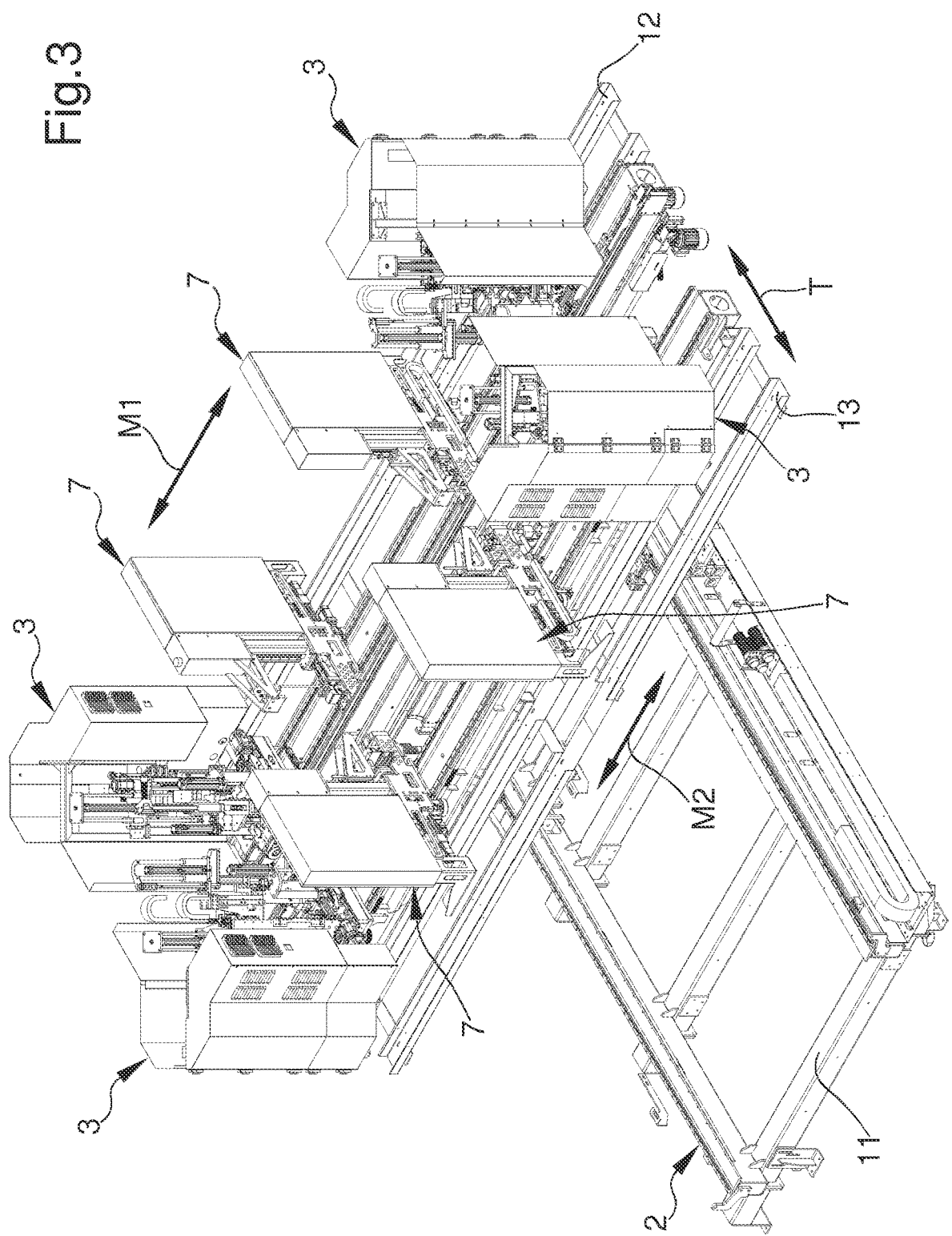
FIG. 3 is an axonometric view of the machine for welding profiled elements according to the invention.

With particular reference to such figures, reference numeral 1 globally indicates a machine for welding profiled elements made of plastic material.

The machine 1 can be used to weld profiled elements made of plastic material, preferably PVC, for the production of a window/door.

It cannot, however, be ruled out that the profiled elements are made of a heat-sealable plastic material other than PVC and/or of a plastic material loaded with a reinforcing material, for example, in the form of fibers, such as glass fibers or the like. Likewise, embodiments cannot be ruled out wherein the profiled elements are partly made of a plastic material and partly made of a different material, in a manner similar to some known types of profiled elements which, e.g., are provided with a canopy, an outer covering or an inner core made of metal, wood or the like.

In particular, according to a first embodiment shown in FIGS. 1 and 3 to 14, the machine 1 is intended to weld together at least two perimeter profiled elements 4, 5, which will form the frame of the window or door, and one or more transverse profiled elements 8.

A further embodiment of the present invention is schematically shown in FIG. 2, wherein the machine 1 is intended to weld at least the two perimeter profiled elements 4, 5 and a central panel G together.

The machine 1 for welding plastic profiled elements comprises at least one main welding device 3 adapted to weld at least two perimeter profiled elements 4, 5 together.

The perimeter profiled elements 4, 5 will form the frame of the window/door.

The first profiled element 4 and the second profiled element 5 extend along their respective longitudinal directions and each of them is provided with at least one extremal area to be welded 6.

In the context of the present disclosure, the expression "area to be welded" means a surface of the profiled element through which the profiled element itself is joined by welding to another profiled element, according to a method which will be described in more detail later in the present disclosure. The extremal area to be welded 6 is transverse to the relevant longitudinal direction and is obtained by cutting the perimeter profiled element at one end.

Each perimeter profiled element 4, 5 comprises two extremal areas to be welded 6 adapted to be welded to respective extremal areas to be welded 6 of two adjacent perimeter profiled elements 4, 5.

Appropriately, the extremal areas to be welded 6 are inclined by an angle comprised between 100 and 80° with respect to the longitudinal direction of the profiled element.

Preferably, the extremal areas to be welded 6 are inclined by an angle substantially equal to 45°.

The machine 1 comprises a plurality of main welding devices 3 adapted to form the frame of the window or door.

In the present case, the machine 1 is intended to the production of rectangular shaped windows or doors and comprises four main welding devices 3, adapted to weld together two first profiled elements 4 and two second profiled elements 5.

FIG. 1 is a schematic representation of the machine 1 which also comprises at least one intermediate welding device 7 which is adapted to weld the first profiled element 4 to a transverse profiled element 8.

More in detail, the machine 1 comprises a plurality of intermediate welding devices 7; in this case, the machine 1 comprises four intermediate welding devices 7 adapted to weld two transverse profiled elements 8 to the first profiled elements 4.

Embodiments cannot however be ruled out wherein the machine 1 comprises a different number of intermediate welding devices 7.

The transverse profiled element 8 comprises at least one transverse area to be welded 9 made at the relevant end, intended to be welded at an intermediate area to be welded 10 of the first profiled element 4.

The transverse area to be welded 9 is obtained by "end milling", i.e. by cutting the transverse profiled element 8 along a direction substantially perpendicular to the relevant longitudinal direction and subsequently shaped to make it substantially complementary to the intermediate area to be welded 10. At the same time, the intermediate area to be welded 10 is a surface of the first profiled element 4, substantially parallel to the longitudinal direction, defined in an intermediate position between the extremal areas to be welded 6, which is not subjected to cutting operations and is welded to the transverse area to be welded 9 without undergoing any machining.

FIG. 2 is a schematic representation of a second embodiment of the machine 1 comprising only the main welding devices 3. Such an embodiment makes it possible to make windows/doors provided with the central panel G coming out of the machine 1.

According to the invention, the main welding devices 3 comprise two heating plates 27, each of which can be placed in contact with a respective extremal area to be welded 6 and arranged substantially parallel to each other at a predefined distance to define a free volume V positioned between them.

Each of the heating plates 27 is of the type of an electrical resistance plate and, once placed in contact with the relevant extremal area to be welded 6 results in an at least partial melting of the plastic material.

The spaced arrangement of the heating plates 27 makes it possible to reduce the thickness of the heating plates themselves and, at the same time, to effectively heat the profiled elements 4, 5 even if they are further spaced apart from each other. This device therefore allows the first profiled element 4 and the second profiled element 5 to be easily machined even if they need to be kept at a greater distance from each other, for example in the case in which the window or door provides for the assembly of one or more transverse profiled elements 8 (FIG. 1) or in the presence of a central panel G placed in the proximity of the profiled elements 4, 5 during the heating phase (FIG. 2). In the latter case, moreover, part of the free volume V can be used to partly house the central panel G, thus allowing the distance to be reduced between the profiled elements and further speed up the welding operations.

In the remainder of the present disclosure, with reference to FIGS. 3 to 14, the first embodiment of the present invention will be described in detail, i.e., wherein the machine 1 comprises the main welding devices 3 and the intermediate welding devices 7.

With reference to FIG. 3, the machine 1 comprises at least one supporting base 2 of the welding devices 3, 7.

Figure 4:
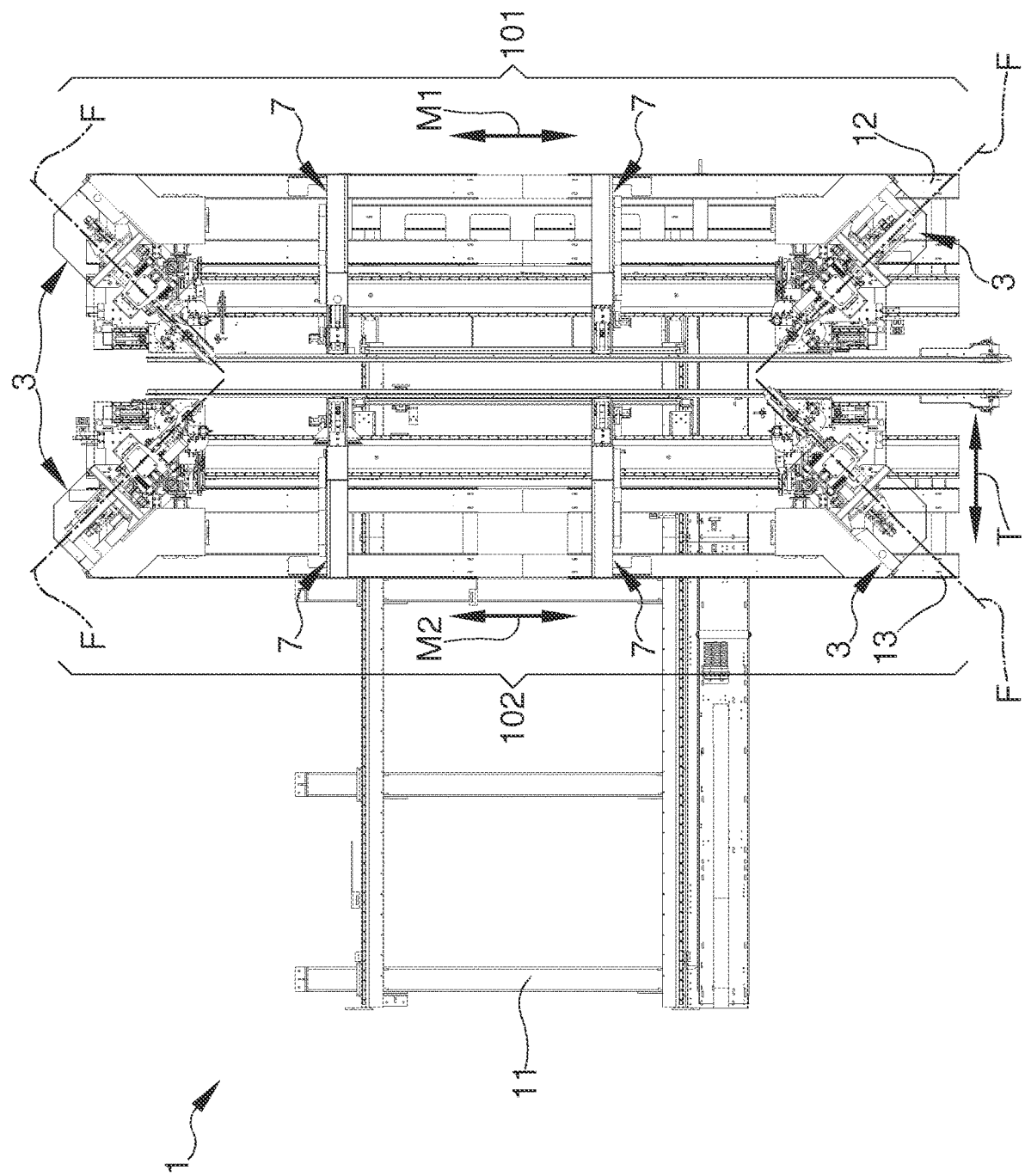
FIG. 4 is a plan view of the machine according to the invention.
Figure 5:
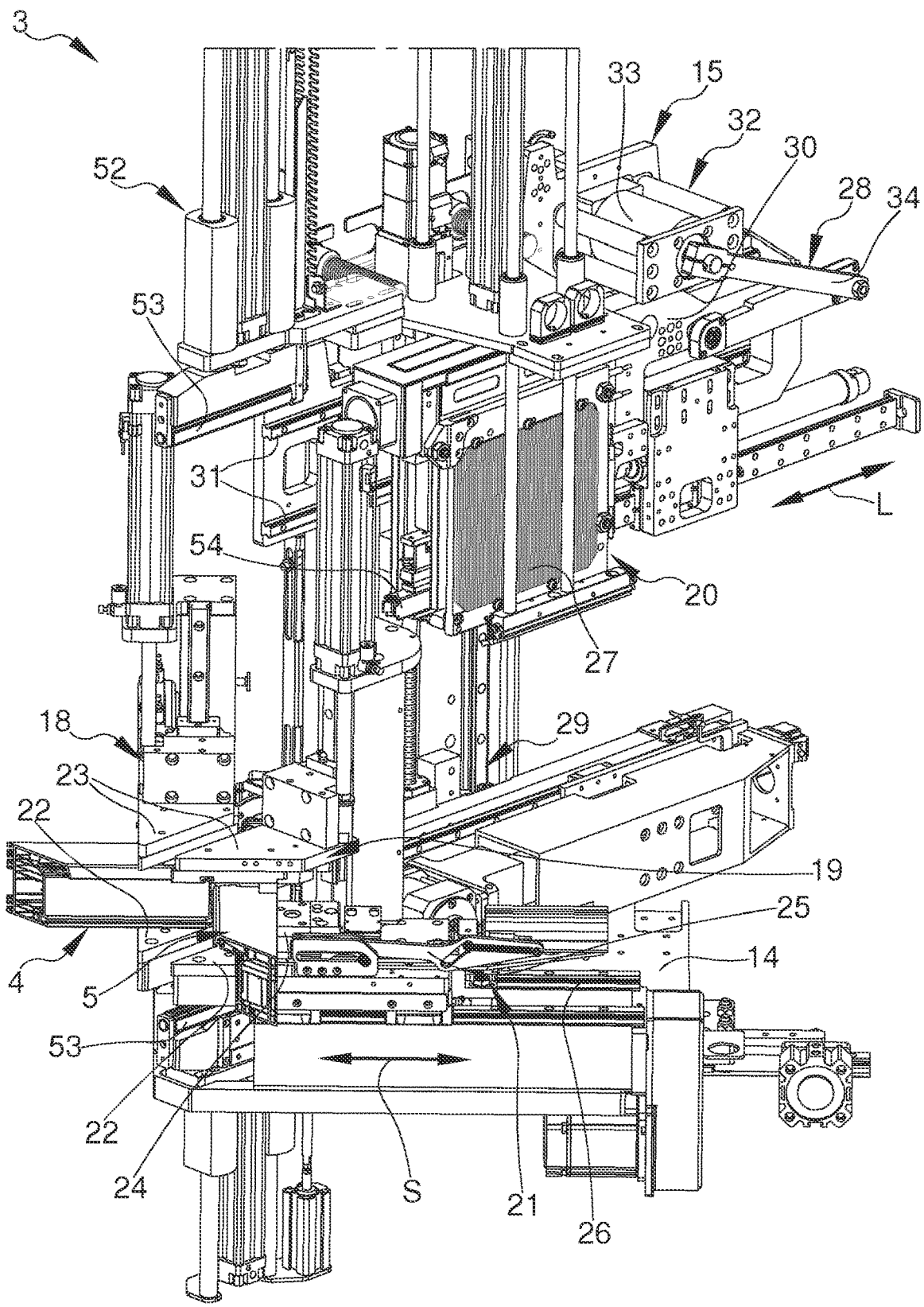
FIGS. 5, 6, 7, 8, 9, 10 11 and 12 are views of the main welding device according to the invention.

As shown in FIG. 4, the welding devices 3, 7 are arranged on the supporting base 2 in two groups 101, 102.

Each group 101, 102 comprises two main welding devices 3 and two intermediate welding devices 7 placed between them, side by side to each other.

In the volume defined between the welding devices 3, 7 of each group 101, 102, a holding and machining area of the first profiled element 4 is defined.

The two groups 101, 102 are arranged, in use, with the welding devices 3, 7 facing each other.

In the volume defined between the corresponding main welding devices 3 of the two groups 101, 102 a holding and machining area of the second profiled elements 5 is defined, while between the corresponding intermediate welding devices 7 of the two groups 101, 102 a holding area of the transverse profiled elements 8 is defined.

The welding devices 3, 7 are mutually movable to position themselves at the respective areas to be welded 6, 9, 10.

More in detail, the supporting base 2 comprises a resting structure 11 intended to be arranged resting on the ground and extending along a direction of shift T and two supporting structures 12, 13, associated with the resting structure 11 and mutually movable along the direction of shift T, each supporting one of the groups 101, 102 of welding devices 3, 7.

Specifically, the supporting base 2 comprises a first supporting structure 12 extending along a first direction of movement M1 substantially perpendicular to the direction of shift T and supporting a first group 101, and a second supporting structure 13 extending along a second direction of movement M2 substantially parallel to the first direction of movement M1 and supporting a second group 102. In more detail, the first supporting structure 12 is fixed with respect to the resting structure 11 and is arranged at one end thereof.

The second supporting structure 13 is movable along the direction of shift T.

For this purpose, the machine 1 comprises movement means placed between the second supporting structure 13 and the resting structure 11, of the type known to the technician in the field and which will not be described in detail in the present disclosure.

The second supporting structure 13 is, therefore, movable close to/away from the first supporting structure 12 to move the second group 102 close to/away from the first group 101, in order to fit the dimensions of the second profiled elements 5 and of the transverse profiled elements 8.

The welding devices 3, 7 of each group 101, 102 are then mutually movable along the relevant directions of movement M1, M2 to place themselves at a respective area to be welded 6, 10 of the first profiled elements 4.

For this purpose, the machine 1 comprises movement means placed between the welding devices 3, 7 and the respective supporting structures 12, 13, of the type known to the technician of the field and which will not be described in detail in the present disclosure.

In the embodiment shown in the figures, both main welding devices 3 move along the corresponding supporting structure 12, 13.

It cannot, however, be ruled out that one of the main welding devices 3 is fixed and the other moves with respect thereto, depending on the length of the first profiled element 4.

Each main welding device 3 comprises at least one main frame 14, associated with the supporting base 2, and a main welding assembly 15, associated with the main frame 14, for the machining of the relevant first profiled element 4 and of the relevant second profiled element 5.

More in detail, the main frame 14 is movably associated with the relevant supporting structure 12, 13 along the relevant direction of movement M1, M2.

Similarly, each intermediate welding device 7 comprises at least one intermediate frame 16, associated with the supporting base 2, and an intermediate welding assembly 17, associated with the intermediate frame 16, for the machining of the relevant first profiled element 4 and of the relevant transverse profiled element 8. More in detail, the intermediate frame 16 is movably associated with the relevant supporting structure 12, 13 along the relevant direction of movement M1, M2.

The intermediate welding device 7 will be described in more detail later on in the present disclosure.

The main welding assembly 15 comprises:
- main retaining means 18, 19 adapted to retain the profiled elements 4, 5 with the extremal areas to be welded 6 facing each other;
- main heating means 20 adapted to heat the extremal areas to be welded 6; and
- main displacement means 21 of the main retaining means 18, 19 adapted to displace the profiled elements 4, 5 between a mutual spacing away position and a mutual approaching position, in which the heated extremal areas to be welded 6 are joined together.

The profiled elements 4, 5 are arranged on the main welding assembly 15 substantially perpendicular to each other, with the extremal areas to be welded 6 substantially parallel to each other.

The main retaining means 18, 19 comprise first retaining means 18 of the first profiled element 4 and second retaining means 19 of the second profiled element 5.

Each of the main retaining means 18, 19 comprises at least one resting surface 22 of the relevant profiled element 4, 5, substantially horizontal, and at least one clamping assembly 23 adapted to keep the profiled element 4, 5 fixed to the relevant resting surface 22.

The clamping assembly 23 is of the type of a vice operated vertically by a piston cylinder, and is adapted to press the profiled element 4, 5 onto the resting surface 22.

Each of the main retaining means 18, 19 also comprises at least one abutment surface 24 of the relevant profiled element 4, 5, substantially vertical, and a retaining assembly 25 adapted to keep the profiled element 4, 5 in contact with the relevant abutment surface 24.

The retaining assembly 25 is of the type of a hook which is movable to intercept the profiled element 4, 5 and pull it towards the abutment surface 24.

After being secured by means of the main retaining means 18, 19, the profiled elements 4, 5 are moved to carry out the welding operations by means of the main displacement means 21.

The main retaining means 18, 19 are, in fact, associated with the main displacement means 21.

In particular, the main displacement means 21 allow precise and accurate movement of both profiled elements 4, 5 along relevant directions of displacement S.

The directions of displacement S are substantially perpendicular to each other.

The main displacement means 21 comprise guidance means 26 associated with the main frame 14, extending along the relevant directions of displacement S and supporting the main retaining means 18, 19 by sliding.

The main displacement means 21 also comprise actuator means, not visible in detail in the figures, adapted to move the main retaining means 18, 19 synchronously along the relevant directions of displacement S.

The actuator means are of a type known to the technician in the field and will not be described in detail in the present disclosure.

As disclosed above, the main welding assembly 15 also comprises main heating means 20.

The main heating means 20 are adapted to at least partly melt the plastic material of the profiled elements 4, 5.

The main heating means 20 comprise the heating plates 27. As shown in FIGS. 1 and 2, the heating plates 27 are arranged substantially parallel to a reference plane F.

With reference to FIG. 4, the reference plane F is inclined by 45° with respect to the directions of movement M1, M2 and to the direction of shift T.

Furthermore, the reference plane F is inclined by an angle substantially equal to 450 with respect to the directions of displacement S.

The heating plates 27 are substantially parallel to the extremal areas to be welded 6.

The welding operation is carried out with the aid of the main displacement means 21 which first have the function of bringing the extremal areas to be welded 6 in contact with the heating plates 27 in order to melt the plastic material, in a so-called "heating position", and then of bringing the partly melted extremal areas to be welded 6 in mutual contact with each other and to press them to join the melted plastic material. The latter, once cooled, hardens and holds the profiled elements 4, 5 joined together.

The heating plates 27 are movable integrally together to arrange themselves in contact with the extremal areas to be welded 6.

Conveniently, the main heating means 20 comprise a movement system 28, 29 of the heating plates 27 between a home position in which they are moved away from the extremal areas to be welded 6 and a working position in which they are placed between the extremal areas to be welded 6.

After being positioned in the working position, the main displacement means 21 move the profiled elements 4, 5 to the heating position in which the extremal areas to be welded 6 are in contact with the relevant heating plates 27.

The movement system 28, 29 comprises at least one unit of forward movement 28 adapted to move the heating plates 27 along a working direction L substantially horizontal between the home position and the working position.

More in detail, the unit of forward movement 28 is adapted to move the heating plates 27 along the working direction L between the working position and a position set back with respect to the profiled elements 4, 5 in order not to clutter the working area and to allow the execution of further machining operations.

Figure 7:
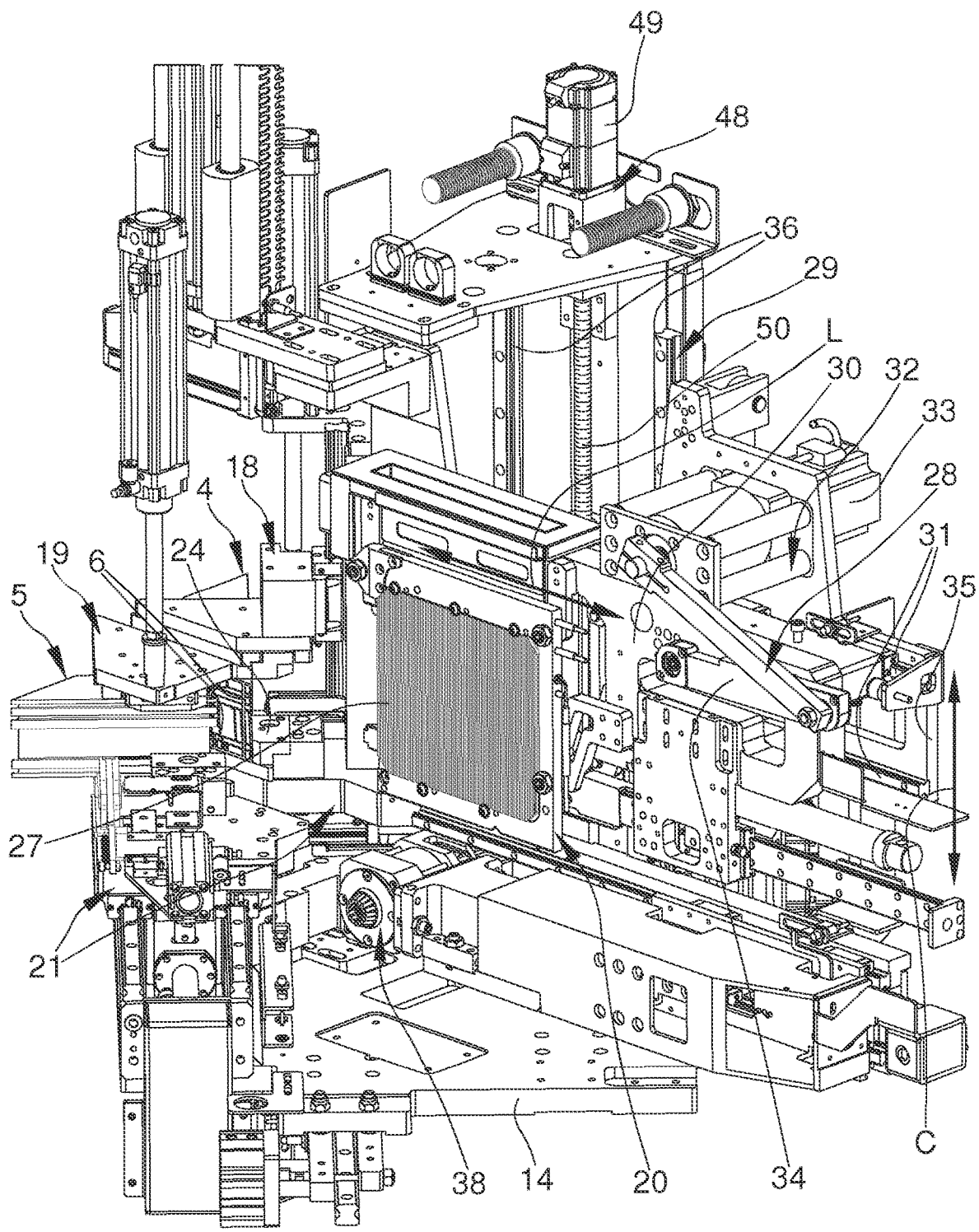

As shown in FIG. 7, the unit of forward movement 28 comprises:
- at least one supporting frame 30 of the heating plates 27;
- at least one guidance assembly 31 extending along the working direction L and supporting in a sliding manner the supporting frame 30; and
- at least one actuator assembly 32 associated with the supporting frame 30 and adapted to move the heating plates 27 along the working direction L.

The working direction L is substantially horizontal.

In the embodiment shown in the figures, the actuator assembly 32 comprises a motor device 33 associated with the main frame 14 and an articulated arm 34 placed between the motor device 33 and the supporting frame 30.

The motor device 33 is of the type of an electric motor and is adapted to set the articulated arm 34 in rotation, the movement of which causes the sliding of the supporting frame 30 and, consequently, of the heating plates 27 along the working direction L.

The actuator assembly 32 is of the type of a controlled-axis movement system and allows micrometric movement of the supporting frame 30.

It cannot however be ruled out that the actuator assembly 32 is of a different type. The movement system 28, 29 comprises at least one sliding assembly 29 adapted to move the heating plates 27 along a transfer direction C substantially vertical between the home position and the working position.

Substantially, the sliding assembly 29 has the function of further moving the heating plates 27 away from the working area when not needed.

The sliding assembly 29 comprises:
- at least one holding structure 35 supporting the guidance assembly 31;
- at least one guidance unit 36 associated with the main frame 14, extending along the transfer direction C and supporting in a sliding manner the holding structure 35;
- at least one actuating unit 37 associated with the holding structure 35 and adapted to move the heating plates 27 along the transfer direction C.

Figure 8:
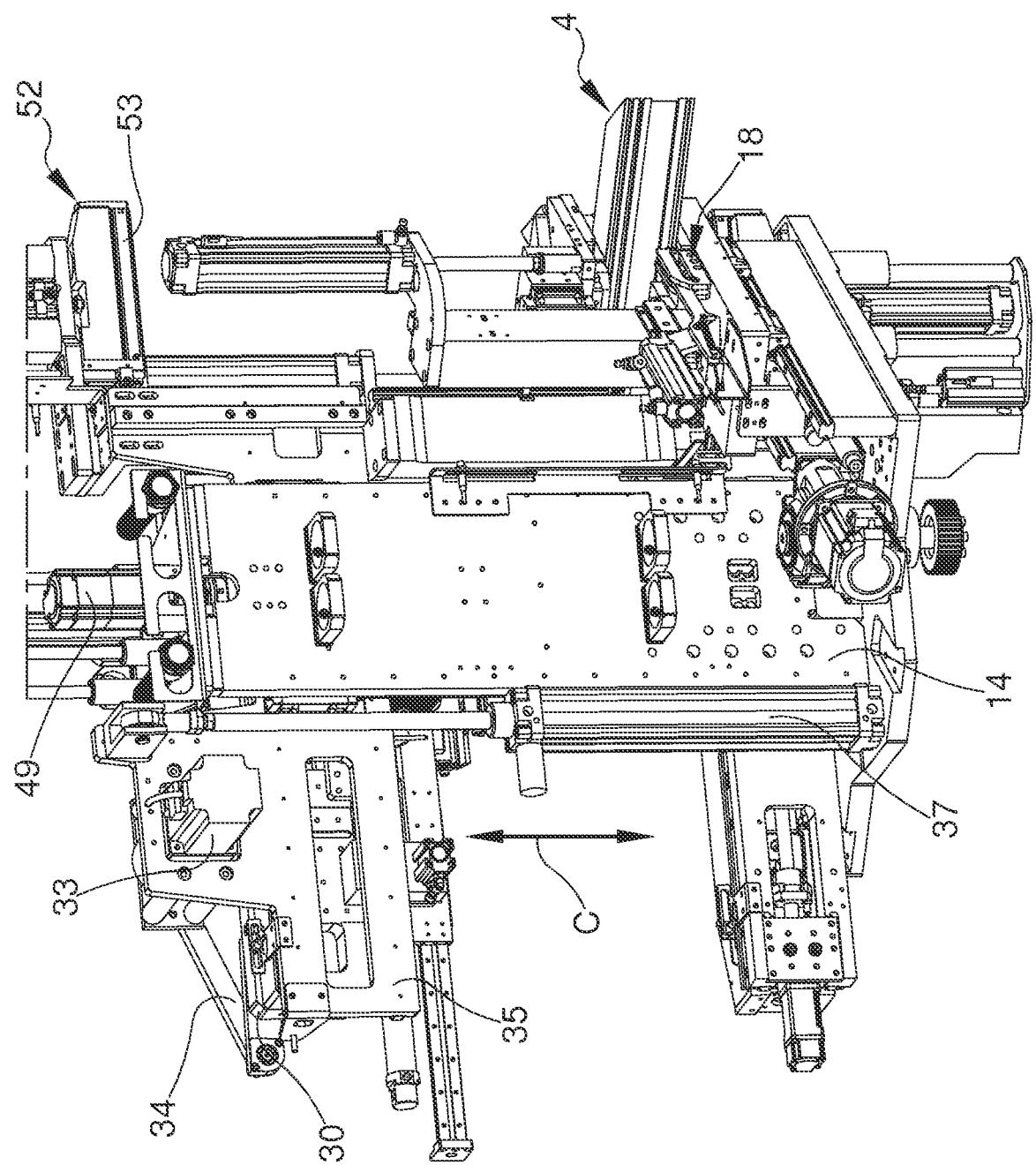

In a preferred embodiment, the actuating unit 37 is of the type of a fluid-operated cylinder placed between the main frame 14 and the holding structure 35 (FIG. 8).

In actual facts, the guidance assembly 31 is mounted on the holding structure 35 and the heating plates 27 slide along the working direction L on the holding structure itself.

Figure 9:
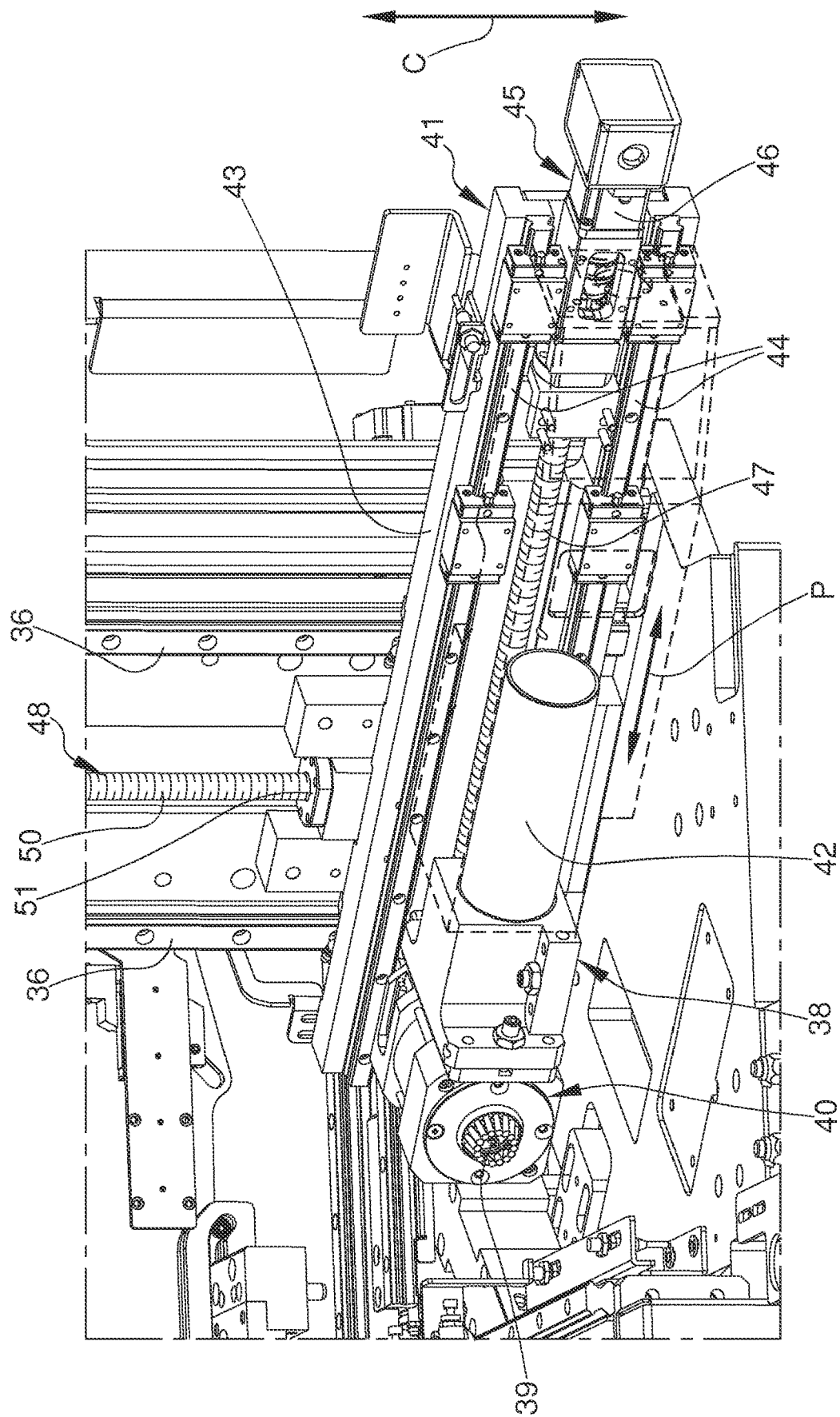

Conveniently, the main welding assembly 15 is also provided with removal means 38 for making a groove on a peripheral edge of the extremal areas to be welded 6 and shown in detail in FIG. 9.

The groove, in particular, affects the peripheral edge of the visible faces of the profiled elements 4, 5.

In the context of the present disclosure, the expression "visible faces" means the substantially flat surfaces of the profiled elements, intended to lie substantially parallel to the lying plane of the window/door made with the profiled elements themselves and to remain visible after that the window/door has been assembled. In actual facts, when the window/door is mounted on a wall, the visible faces are the surfaces of the profiled elements facing the inside or the outside of the wall. The groove has the function of reducing, in part, the length of the visible faces so that, after welding the profiled elements, the welding bead extends towards the inside of the profiled elements 4, 5 and, therefore, is not visible on the visible faces of the window/door.

For the purposes of the present disclosure, the expression "welding bead" means the portion of excess molten plastic material that is compressed during the joining of the profiled elements and can result protruding with respect to the faces of the profiled elements themselves. The welding bead, therefore, involves the entire perimeter edge of the extremal areas to be welded 6.

Thanks to the groove, after the profiled elements 4, 5 have been welded together, their visible faces are perfectly matched to each other.

Moreover, the removal means 38 have the function of removing part of the material making up the profiled elements 4, 5, at the faces and/or the internal portions, in order to allow an optimal welding thereof.

For example, the removal means 38 are also adapted to remove a thin layer of plastic material sufficient to flatten and even out the extremal areas to be welded 6.

In other words, the removal means 38 are not only for shaping the grooves, but can be absolutely essential for equalizing and correcting any cutting errors. In the absence of such leveling, the extremal areas to be welded 6 would be too irregular and, therefore, not weldable.

It is further noted that the grooves and leveling of the extremal areas to be welded 6 are made by the removal means 38 when the profiled elements 4, 5 are already mounted on the main retaining means 18, 19; the extremal areas to be welded 6 are coupled and melted together without disassembling the profiled elements 4, 5 from the main retaining means 18, 19.

In other words, the tooling of the profiled elements 4, 5 on the main retaining means 18, 19 occurs only once and the main welding assembly 15 is able to perform all the steps envisaged by the machining without the profiled elements 4, 5 having to be prepared and/or machined on other machines.

This feature, in addition to ensuring remarkable speed of execution, allows avoiding welding errors due to an incorrect assembly of the profiled elements 4, 5 on the main retaining means 18, 19.

In fact, should the groove and/or leveling be carried out on a different machine and the profiled elements 4, 5 mounted on the main welding device 3 at a later time to be welded, there would be a risk of positioning the extremal areas to be welded 6 not perfectly facing and parallel and of compromising the welding of the profiled elements themselves.

Alternative embodiments of the present invention cannot however be ruled out wherein the machine 1 is not provided with the removal means 38 and the execution of the grooves and/or the leveling of the profiled elements 4, 5 are carried out on separate milling machines before the profiled elements themselves are placed on the machine 1.

The removal means 38 are mounted on the main welding assembly 15 and comprise a pair of milling tools 39 arranged facing the respective extremal areas to be welded 6 and movable in rotation around a relevant axis of rotation.

The axis of rotation is substantially horizontal and perpendicular to the reference plane F.

In other words, the axis of rotation is inclined substantially by 45° with respect to the longitudinal directions of the first profiled element 4 and of the second profiled element 5 and substantially perpendicular to the extremal areas to be welded 6.

In particular, the milling tools 39 are positioned so as to simultaneously make the grooves on both profiled elements 4, 5.

The removal means 38 comprise:
- at least one tool assembly 40 supporting the milling tools 39 in rotation; and
- a positioning system 41 of the tool assembly 40 which is adapted to arrange the milling tools 39 at the extremal areas to be welded 6 and to move them on these to remove the plastic material.

More in detail, the tool assembly 40 comprises an electric motor adapted to set the milling tools 39 in rotation around the axis of rotation.

During removal, the tool assembly 40 is placed between the extremal areas to be welded 6.

The tool assembly 40 also comprises a suction unit 42 adapted to suck in the residues of plastic material generated during the removal of the plastic material. The suction unit 42 comprises a suction port defined at the milling tool 39, through which the residues of plastic material are conveyed to a recovery container.

For this purpose, moreover, the milling tool 39 is of helical conformation so as to convey the removed chips towards the suction port and facilitate their moving away. It cannot, however, be ruled out that the milling tool 39 is of a different conformation.

In more detail, the milling tool 39 is arranged through the suction port towards the extremal areas to be welded 6.

The suction unit 42 also comprises a plurality of brush elements arranged radially around the suction port.

During removal, the brush elements contact the extremal areas to be welded 6 and allow the effective removal of the plastic residues from these areas, thus facilitating the suction thereof.

The positioning system 41 comprises at least one holding frame 43 movably associated with the main frame 14 and supporting the tool assembly 40.

The positioning system 41 comprises a pair of guides 44 associated with the holding frame 43, extending along a substantially horizontal positioning direction P and supporting the tool assembly 40 in a sliding manner.

The positioning system 41 also comprises a first drive assembly 45 adapted to move the tool assembly 40 along the positioning direction P.

The first drive assembly 45 comprises a first motor device 46 and a first worm shaft 47 extending along the positioning direction P.

The first worm shaft 47 engages a first threaded wheel associated with the tool assembly 40.

The rotation of the first worm shaft 47 results in the movement of the tool assembly 40 along the positioning direction P.

The holding frame 43, moreover, is in turn associated with the guidance unit 36 in a sliding manner.

The holding frame 43 is, therefore, also movable along the transfer direction C.

The positioning system 41 comprises a second drive assembly 48 adapted to move the tool assembly 40 along the transfer direction C, shown in more detail in FIG. 7.

The second drive assembly 48 comprises a second motor device 49 and a second worm shaft 50 extending along the transfer direction C.

The second worm shaft 50 engages a second threaded wheel 51 associated with the holding frame 43.

The rotation of the second worm shaft 50 results in the movement of the holding frame 43, and consequently of the tool assembly 40, along the transfer direction C.

In this way, the milling tools 39 can be positioned extremely precisely in the reference plane F to perform the removal of the plastic material.

Moreover, it should be pointed out that the particular expedient of mounting the main heating means 20 and the removal means 38 on the same guidance unit 36 allows considerably reducing the overall dimensions of the main welding device 3 thus limiting the components thereof.

The main welding assembly 15 also comprises containment means 52 adapted to abut against the extremal areas to be welded 6 to contain the welding bead.

More in detail, the containment means 52 are adapted to contain the welding bead protruding with respect to the visible faces and to the outer side faces of the profiled elements 4, 5.

In the context of the present disclosure, the expression "side faces" means the surfaces of the profiled elements intended to lie substantially perpendicular to the lying plane of the window/door manufactured with the profiled elements themselves.

Substantially, in the case of the window/door leaf, the inner side faces of the profiled elements are intended to intercept a central panel (e.g. a glass pane) of the leaf and the outer side faces are intended to define the outer side perimeter of the leaf and abut against a frame of the window/door fixed to the wall, when closed.

On the other hand, in the case of the window/door, the inner side faces of the profiled elements are intended to abut against the door or window (when closed) while the outer perimeter faces are intended to face the wall to which the frame is fixed.

The containment means 52 comprise:
a pair of containment bodies 53 adapted to contain the welding bead protruding from the visible faces of the profiled elements 4, 5; and
at least one containment element 54 adapted to contain the welding bead protruding from the outer side faces of the profiled elements 4, 5.

In particular, the containment bodies 53 are arranged facing each other from opposite sides (above and below) with respect to the lying plane of the profiled elements 4, 5 and are movable mutually close to each other to abut against the relevant visible faces of the profiled elements themselves at the extremal areas to be welded 6.

The containment bodies 53 are known to the technician in the field and will not be described in detail in the present disclosure.

The containment element 54, on the other hand, is adapted to abut on the outer side faces of the profiled elements 4, 5 at the extremal areas to be welded 6.

Specifically, the containment element 54 is V-shaped and is intended to contact the outer side faces of the profiled elements 4, 5 after they are joined together. An example of a containment element 54 is further described in WO 2017/009779 A1.

Figure 6:
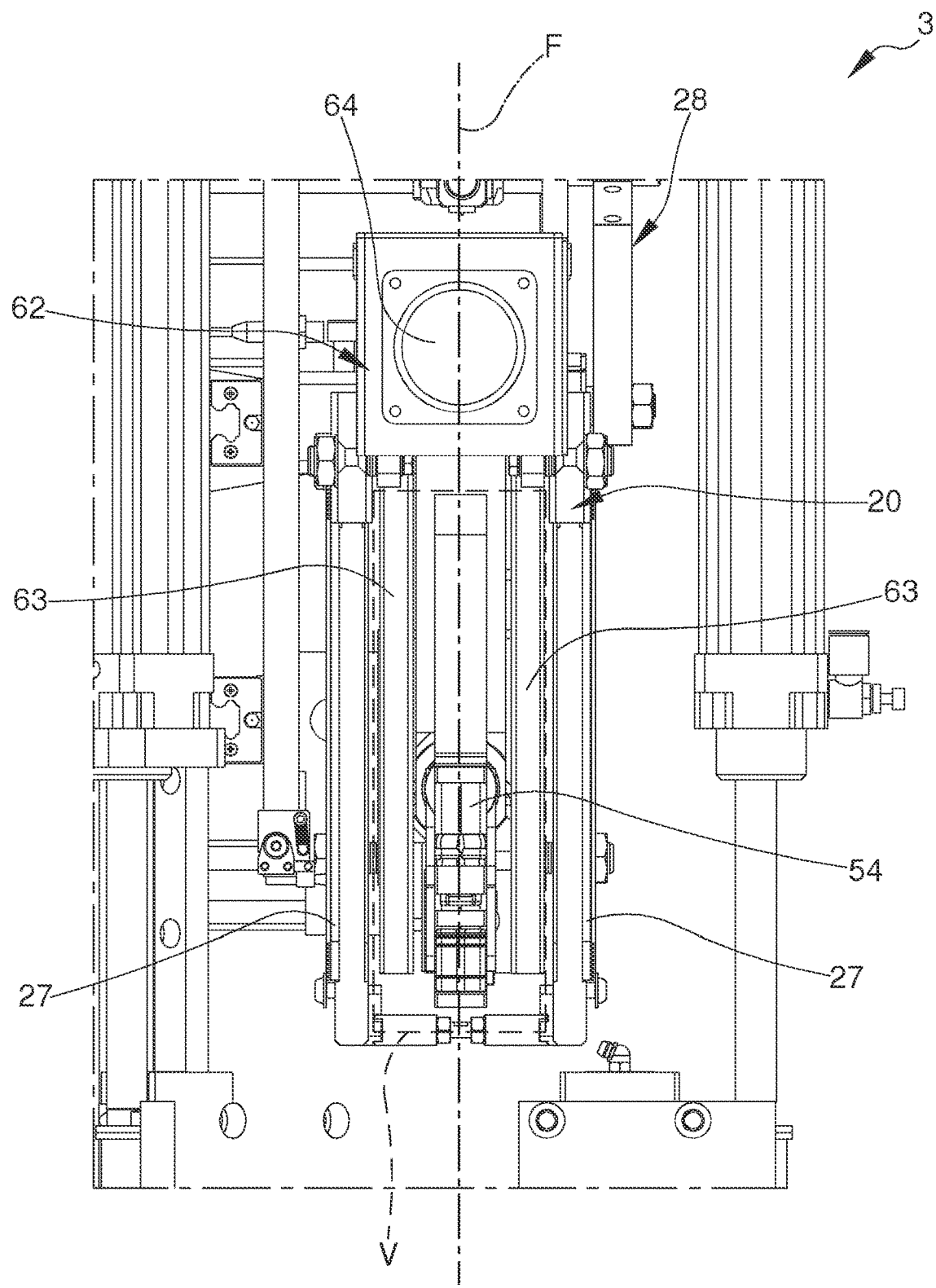

Advantageously, as also shown in FIG. 6, the containment element 54 is placed between the heating plates 27.

This solution allows exploiting the space between the heating plates 27 and reducing the volumetric size of the main welding device 3.

The containment element 54 is movable along a substantially horizontal operational direction W between a home position, in which it is moved away from the profiled elements 4, 5 and in which it is placed at least partly inside the free volume V, and an operational position, in which it is moved close to the profiled elements 4, 5 to contain the welding bead and in which it is placed outside the free volume V.

The particular expedient of arranging the containment element 54 at least partly inside the free volume V is particularly advantageous in that, in addition to reducing the overall dimensions of the main welding device 3, it also makes it possible to speed up the containment operations of the welding bead.

In fact, as soon as the extremal areas to be welded 6 have been heated until at least partial melting of the plastic material, they must be promptly placed in mutual contact in order to avoid undesired cooling of the melted plastic material before joining the profiled elements 4, 5. At the same time, the containment means 52 must abut on the extremal areas to be welded 6 in order to contain the welding bead.

It is clear, therefore, that these operations must be carried out quickly in order to make the final window/door strong and with a valuable aesthetic effect.

The arrangement of the containment element 54 in the free volume V facilitates the movement of the various components as well as the welding operations.

The main welding assembly 15 comprises at least one movement unit 55 of the containment element 54 between the home position and the operational position, which unit is arranged at least partly inside the free volume V.

Figure 10:
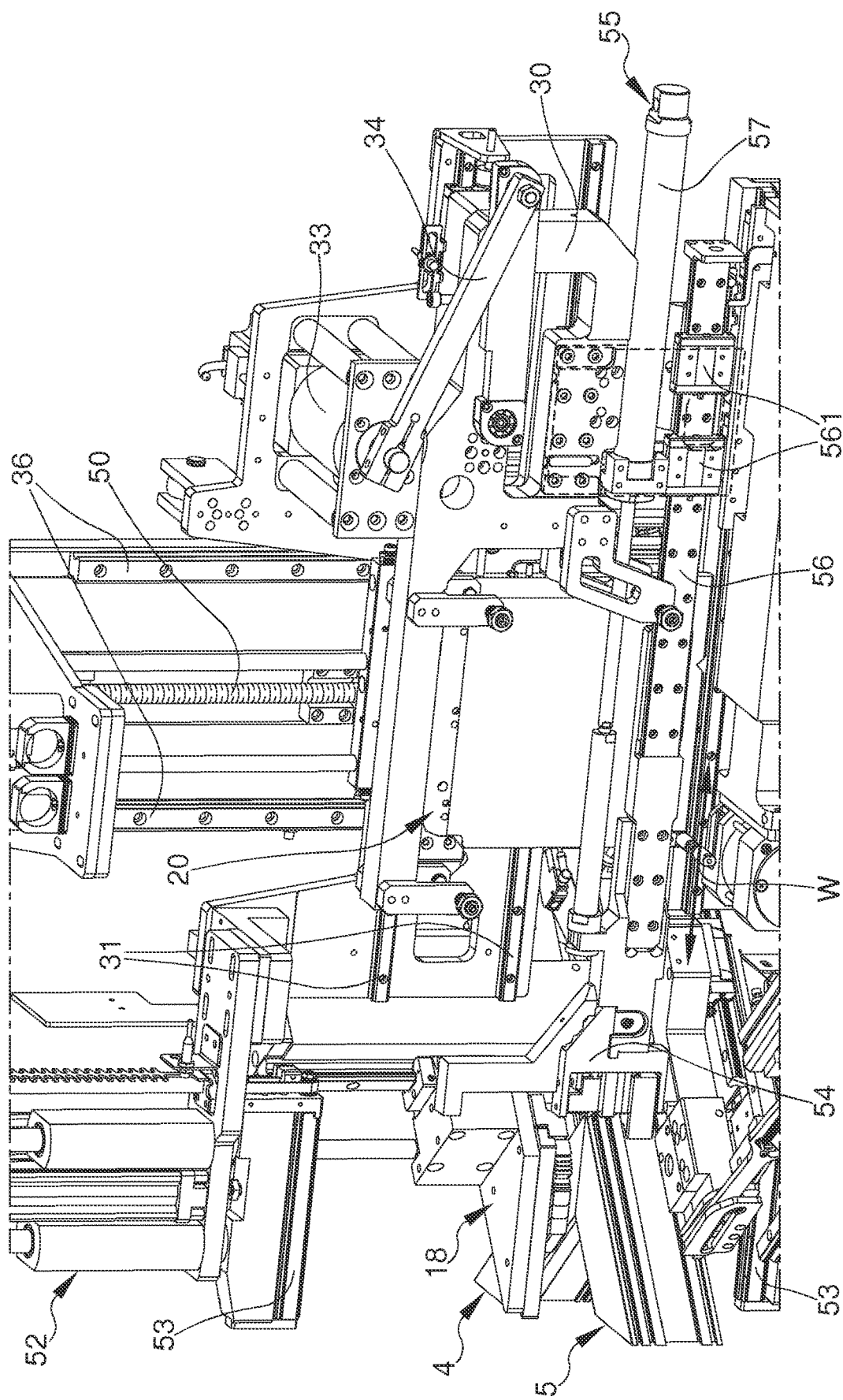

FIG. 10 shows the movement unit 55 with the containment element 54 in an operational position.

The movement unit 55 comprises:
- at least one holding body 56 of the containment element 54 extending along the operational direction W;
- at least one guidance system 561 to the supporting frame 30 and supporting in a sliding manner the holding body 56;
- at least one actuating device 57 associated with the holding body 56 and adapted to move the containment element 54 along the operational direction W.

The holding body 56 has an elongated conformation, extends along the operational direction and is movably associated with the guidance system 561.

The containment element 54 is associated with one end of the holding body 56.

In turn, the actuating device 57 is placed between the holding body 56 and the supporting frame 30.

Preferably, the actuating device 57 is of the type of a pneumatic cylinder.

After being placed in the operational position, the containment element 54 must be able to overcome the force exerted by the molten plastic material that is crushed during the joining of the profiled elements 4, 5.

The containment element 54 is, therefore, brought to the operational position by means of the actuating device 57 and then pressed on the profiled elements 4, 5 by means of the actuator assembly 32.

The actuator assembly 32 is, therefore, also adapted to move the containment element 54 along the operational direction W to exert a pressing force on the profiled elements 4, 5.

For this purpose, the movement unit 55 comprises a clamping system 58 of the containment element 54 in the operational position.

Figure 11:
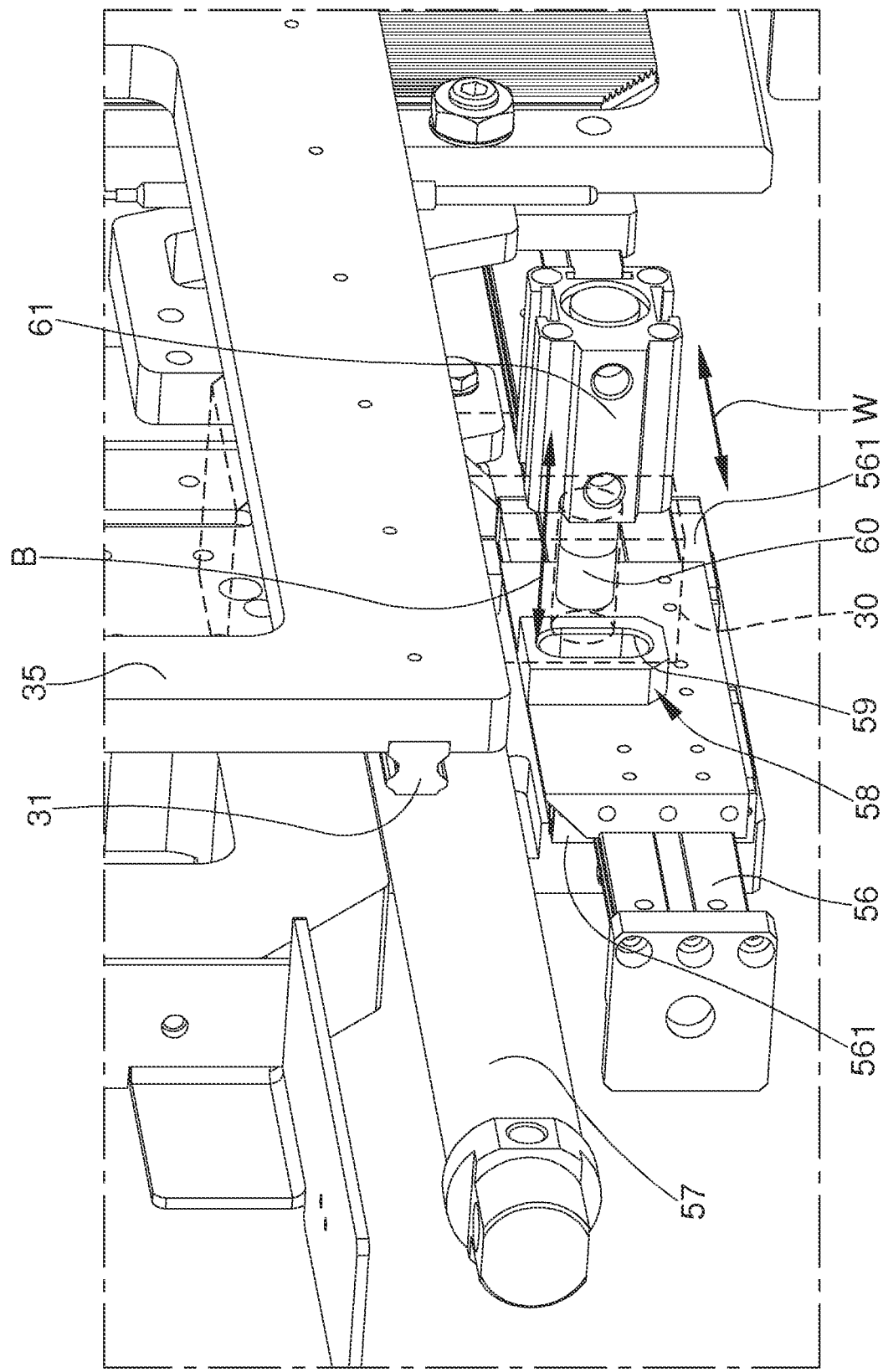

The clamping system 58, shown in detail in FIG. 11, prevents the actuating device 57 from retracting as a result of the pressure exerted by the welding bead, and causes the containment element 54 to exert a nearly constant pressing force. This force is ensured by the forward movement of the actuator assembly 32, which may conveniently occur in a micrometer manner by a numerically controlled axis.

The clamping system 58 comprises:
- at least one slot 59 defined on the holding body 56 at an opposite end to the containment element 54;
- at least one securing pin 60 associated movable with the supporting frame 30, movable to engage with the slot 59 and prevent the holding body 56 from sliding on the guidance system 561.

More specifically, the securing pin 60 is movable along a clamping direction B transverse to the operational direction W.

The clamping system 58 also comprises an actuator cylinder 61 adapted to move the securing pin 60 along the clamping direction B.

The actuator cylinder 61 is e.g. of the type of a pneumatic cylinder.

Conveniently, the main welding assembly 15 comprises main cooling means 62 associated with the supporting frame 30 and adapted to cool the free volume V and to reduce overheating of the components.

Figure 12:
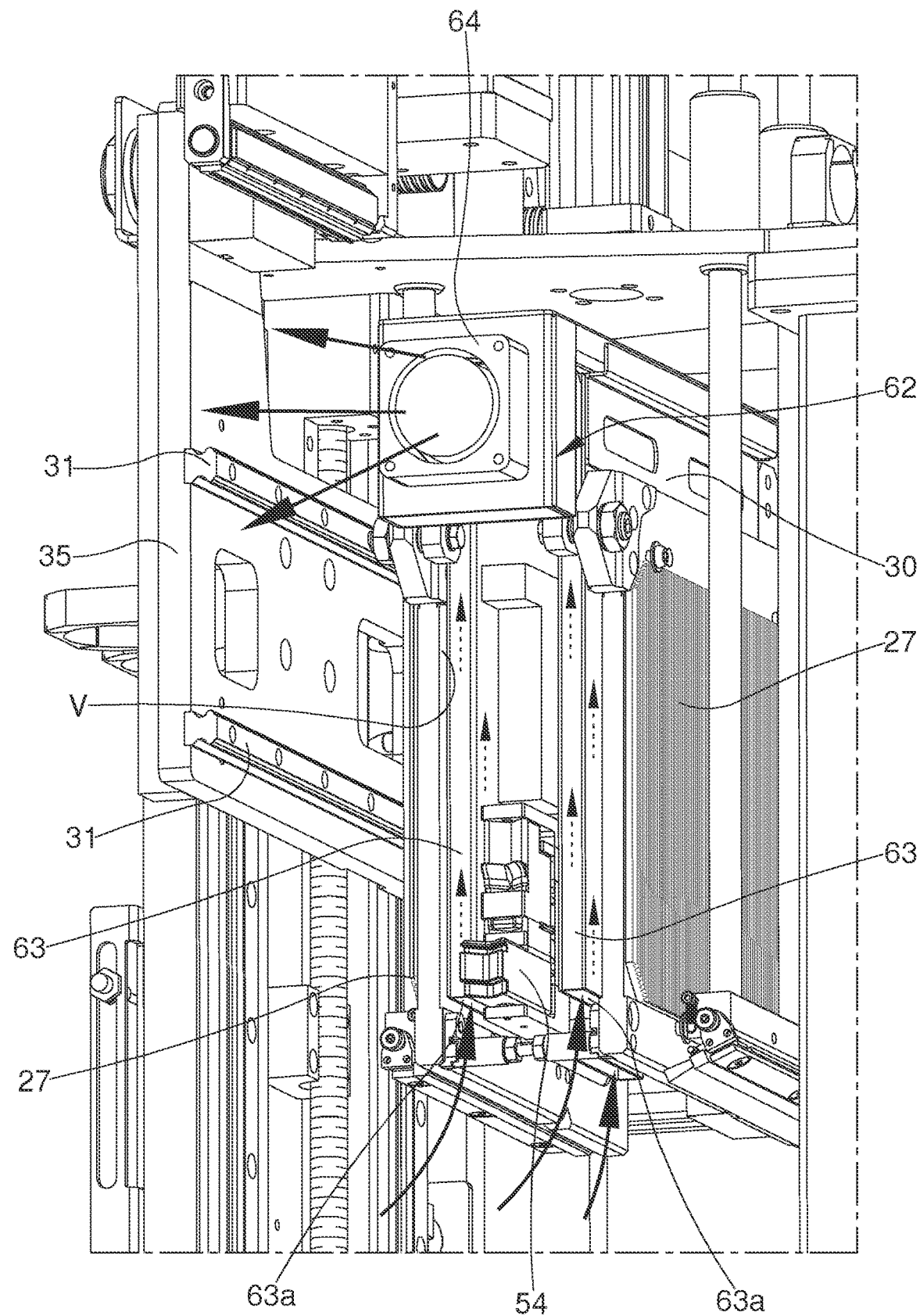

The main cooling means 62, shown in FIG. 12, have the function of maintaining a reduced temperature inside the free volume V and of preventing the components arranged therein from overheating.

In particular, the main cooling means 62 allow easy handling of such components by an operator, e.g. to allow replacements or maintenance jobs.

In addition, the main cooling means 62 ensure that the heat issued from the heating plates 27 does not damage the components of the main welding assembly 15, such as, e.g., the containment element 54 and the relevant movement unit 55, or of the profiled elements 4, 5.

The main cooling means 62 comprise:
- at least one cooling casing 63 associated with one of the heating plates 27 inside the free volume V and defining an inner tube 63a; and
- at least one suction assembly 64 connected in a fluid-operated manner to the cooling casing 63 and adapted to suck air through the inner tube 63a.

Specifically, in the embodiment shown in the figures, the main cooling means 62 comprise a pair of cooling casings 63, each associated with a respective heating plate 27 and defining a relevant inner tube 63a.

The suction assembly 64 is of the type of a cooling fan.

As set forth above, the machine 1 comprises intermediate welding devices 7.

Figure 13:
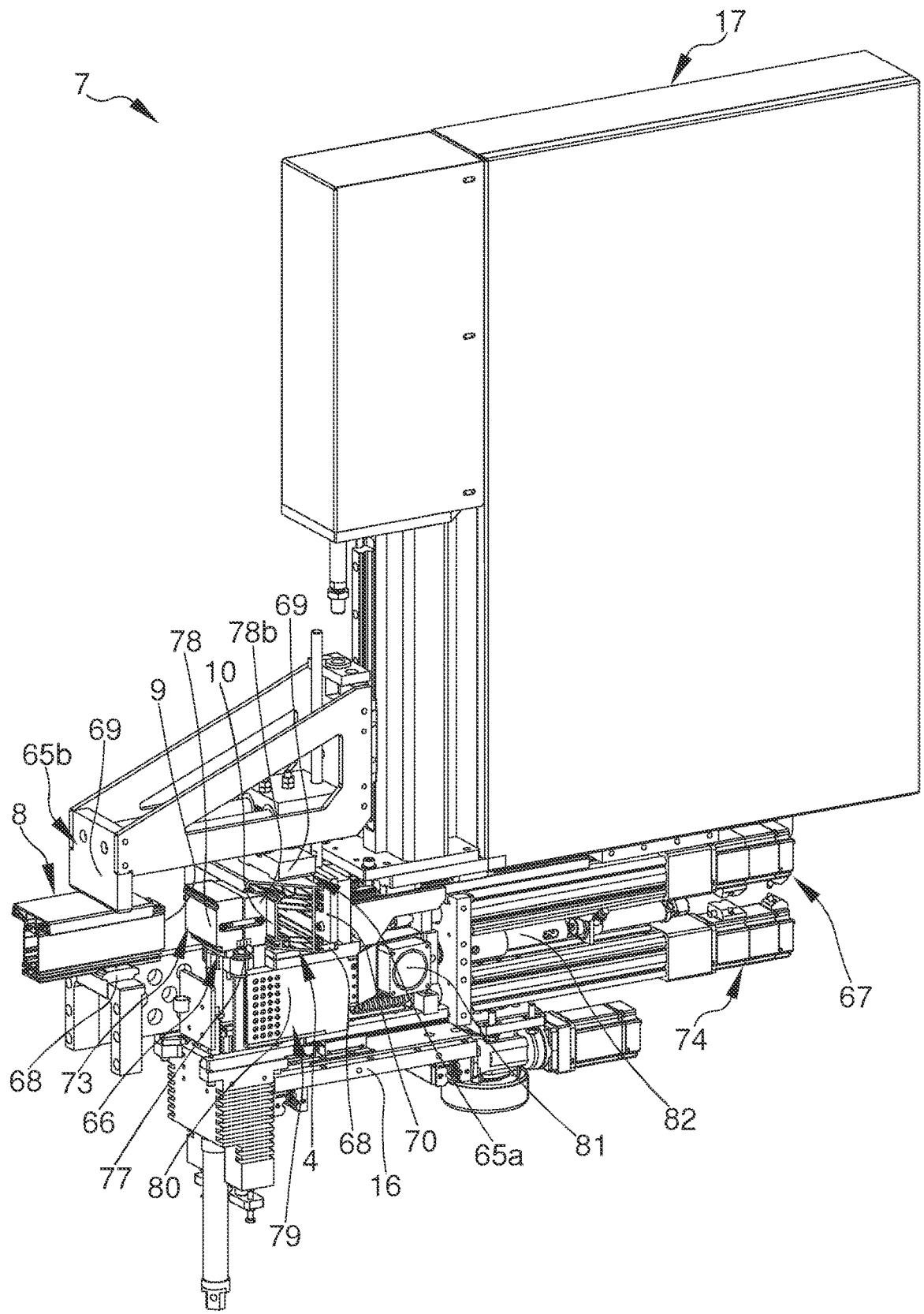
FIGS. 13-14 are views of the intermediate welding device according to the invention.
Figure 14:
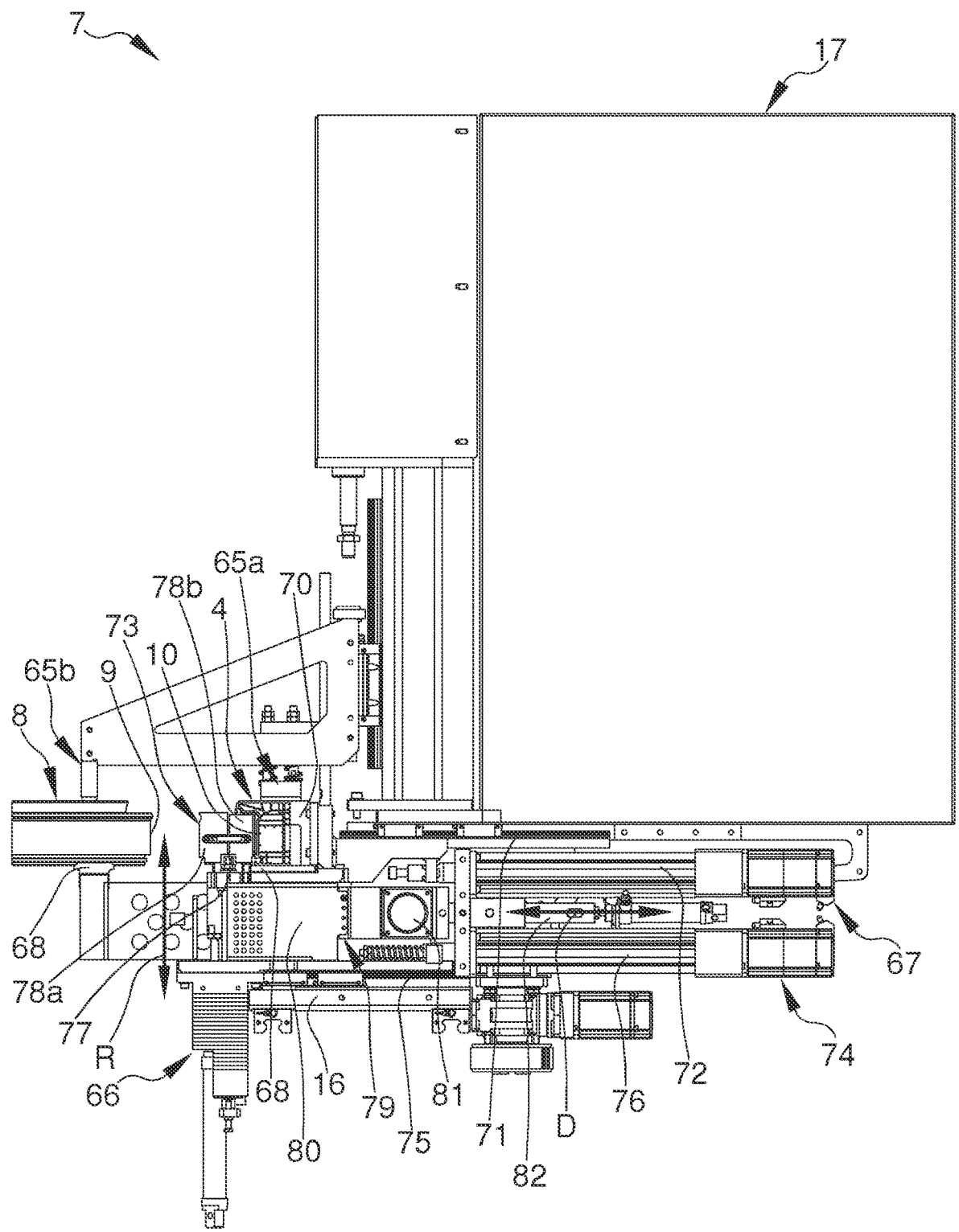

Each intermediate welding device 7, as shown in FIGS. 13 and 14, comprises at least one intermediate frame 16, associated with the supporting base 2, and an intermediate welding assembly 17, associated with the intermediate frame 16, for the machining of the relevant first profiled element 4 and of the relevant transverse profiled element 8.

The intermediate welding assembly 17 comprises:
- intermediate retaining means 65a, 65b adapted to retain the first profiled element 4 and the transverse profiled element 8 respectively with the intermediate area to be welded 10 and the transverse area to be welded 9 facing each other;
- intermediate heating means 66 adapted to heat the transverse area to be welded 9 and the intermediate area to be welded 10; and
- intermediate displacement means 67 of the intermediate retaining means 65a, 65b adapted to mutually displace the profiled elements 4, 8 between a moving away position and an approaching position, in which the heated areas to be welded 9, 10 are joined to each other.

The intermediate retaining means 65a, 65b comprise retaining means of the first profiled element 65a and retaining means of the transverse profiled element 65b.

Each of the intermediate retaining means 65a, 65b comprises at least one resting base 68 of the relevant substantially horizontal profiled element 4, 8 and at least one vice unit 69 adapted to keep the profiled element 4, 8 fixed to the relevant resting base 68.

The vice unit 69 is of the type of a vertically operated vice and is adapted to press the profiled element 4, 8 on the resting base 68.

The retaining means of the first profiled element 65a also comprise at least one substantially vertical stop surface 70 on which the first profiled element 4 is placed in contact.

After being secured by means of the intermediate retaining means 65a, 65b, the first profiled element 4 is movable with respect to the transverse profiled element 8 to carry out the welding operations by means of the intermediate displacement means 67.

The retaining means of the first profiled element 4 are, in fact, associated with the intermediate displacement means 67.

In particular, the intermediate displacement means 67 are adapted to move the first profiled element 4 along a sliding direction D in order to bring it closer to/away from the transverse profiled element 8.

The intermediate displacement means 67 comprise first sliding guides 71 associated with the retaining means of the first profiled element 4, which extend along the sliding direction D and which are movably associated in a sliding manner with the intermediate frame 16.

The intermediate displacement means 67 also comprise at least one first intermediate actuator 72, of the type of an electric cylinder, adapted to move the retaining means of the first profiled element 4 along the sliding direction D.

The intermediate displacement means 67 are also operatively connected to the main displacement means 21 to allow coordinated movement of the first profiled element 4.

For this purpose, the machine 1 comprises connecting means between the intermediate displacement means 67 and the main displacement means 21, not shown in detail in the figures. In particular, the connecting means are of the electrical type. It cannot however be ruled out that the connecting means are of a different type.

The intermediate heating means 66 are adapted to at least partly melt the plastic material of the profiled elements 4, 8.

The intermediate heating means 66 comprise at least one heating unit 73 adapted to heat the intermediate area to be welded 10 and the transverse area to be welded 9.

The heating unit 73 is shaped so as to fit the inner side face of the first profiled element 4.

In this regard, it should be noted that the side faces of the profiled elements are generally irregular and have protrusions and recesses aimed at ensuring an optimal seal of the finished window/door.

Therefore, the heating unit 73 comprises:
- at least one heating body 77 with electric resistance; and
- at least one removable covering body 78a, 78b, arranged so as to wrap the heating body 77 and shaped to fit the conformation of the first profiled element 4 and of the transverse profiled element 8.

The covering body 78a, 78b is made to effectively contact the areas to be welded 9, 10. In particular, the covering body 78a, 78b is of a complementary conformation to the conformation of the inner side face of the first profiled element 4.

More in detail, the covering body 78a, 78b is made up of two half-shells 78a and 78b, each adapted to contact a respective area to be welded 9, 10.

It cannot however be ruled out that the covering body 78a, 78b is made as a single body piece.

The heating unit 73 is adapted to at least partly melt the plastic material of the profiled elements 4, 8, which are then joined and pressed together to bring the melted plastic material into contact. After being cooled, the plastic material hardens and holds the profiled elements joined together.

The heating unit 73 is mounted on the intermediate frame 16 and is movable with respect thereto to position itself between the intermediate area to be welded 10 and the transverse area to be welded 9.

The heating unit 73 is movable between:
- an active condition, in which it is positioned between the first profiled element 4 and the transverse profiled element 8 to heat and melt at least partly the areas to be welded 9, 10; and
- a home condition, in which it is moved away from the first profiled element 4 and from the transverse profiled element 8 to allow the joining of the profiled elements themselves.

More in detail, in the home condition, the heating unit 73 is arranged below the intermediate retaining means 65a, 65b.

Specifically, in the home condition, the heating unit 73 is arranged below the resting bases 68.

The heating unit 73 is movable with respect to the intermediate frame 16 between the active condition and the home condition by means of a vertically-operable pneumatic cylinder. Further embodiments cannot however be ruled out wherein the heating unit 73 is moved by means of different types of means.

The heating unit 73 is, therefore, movable along a heating direction R substantially perpendicular to the sliding direction D.

In the active condition, the heating unit 73 is further movable along the sliding direction D to approach the transverse profiled element 8 and to match the transverse area to be welded 9 of the transverse profiled element 8 blocked by the retaining means of the transverse profiled element 65b.

For this purpose, the intermediate welding device 17 is provided with auxiliary displacement means 74 comprising second sliding guides 75 associated with the intermediate heating means 66, which extend along the sliding direction D and which are movably associated in a sliding manner with the intermediate frame 16.

The auxiliary displacement means 74 also comprise at least a second intermediate actuator 76, of the type of an electric cylinder, adapted to move the intermediate heating means 66 along the sliding direction D.

Conveniently, the intermediate displacement means 67 and the auxiliary displacement means 74 are adapted to position and move respectively the first profiled element 4 and the heating unit 73 at adjustable speeds depending on the machining phase to be carried out.

Advantageously, the intermediate welding assembly 17 also comprises intermediate cooling means 79 adapted to cool the intermediate retaining means 65a, 65b by overheating caused by the heating unit 73.

The intermediate cooling means 79 comprise:
- at least one cooling shell 80 defining an inner tube and shaped to cover the heating unit 73 in the home condition; and
- suction means 81 connected in a fluid-operated manner to the cooling shell 80 and adapted to suck in air through the inner tube.

In this way, when the heating unit 73 is in a non-use condition, it is housed inside the cooling shell 80, which allows a reduced temperature to be maintained below the resting bases 68.

Conveniently, the intermediate cooling means 79 are movable parallel to the sliding direction D, by means of a linear actuator 82, to position the cooling shell 80 to coat the heating unit 73.

The operation of the present invention is as follows.

Initially, the welding devices 3, 7 are moved on the relevant supporting structures 12, 13 depending on the length of the first profiled elements 4 and of the second profiled elements 5.

Each of the first profiled element 4 and each of the second profiled elements 5 are placed in the relevant working areas so as to position the extremal areas to be welded 6 at the main welding devices 3.

The intermediate welding devices 7 are moved along the relevant directions of movement M1, M2 to place themselves at the intermediate areas to be welded 10. At this point, the transverse profiled elements 8 are in turn positioned at the intermediate welding devices 7 so that the transverse areas to be welded 9 face the intermediate areas to be welded 10.

The profiled elements 4, 5, 8 are, therefore, kept stationary by the respective retaining means 18, 19, 65a, 65b.

At this point, the removal means 38 level the extremal areas to be welded 6 and make the grooves at the visible faces of the profiled elements 4, 5.

Subsequently, the heating plates 27 are moved in the working position towards the extremal areas to be welded 6 to place themselves between the first profiled element and the second profiled element 5.

Simultaneously, the main displacement means 21 move the first profiled element 4 and the second profiled element 5 in mutual approach to bring the extremal areas to be welded 6 in contact with the heating plates 27.

Similarly, the heating unit 73 is brought to the active condition to place itself between the first profiled element 4 and the transverse profiled element 8, and the intermediate displacement means 67 and the auxiliary displacement means 74 move the first profiled element 4 and the heating unit 73, respectively, towards the transverse profiled element 8 to bring the intermediate area to be welded 10 and the transverse area to be welded 9 in contact with the heating unit itself.

After the plastic material has been melted, the heating plates 27 and the heating unit 73 are moved away from each other to allow the first profiled element 4 to be approached by the second profiled element 5 and the transverse profiled element 8.

The containment means 52 are moved to abut on the visible faces and on the side faces of the first profiled element 4 and the second profiled element 5 to contain the welding bead.

In this sense, the containment bodies 53 abut on the visible faces of the profiled elements 4, 5, both above and below the lying plane of the profiled elements themselves, while the containment element 54 abuts on the outer side faces.

After being brought to the operational position, the containment element 54 is blocked by the clamping system 58 and moved by the actuator assembly 32 along the working direction L in order to exert a pressing force on the profiled elements 4, 5 to counteract the escape of the welding bead.

All the above mentioned phases are carried out quickly and in a timely manner in order to avoid solidification of the melted material before the complete joining of the profiled elements 4, 5, 8.

It has in practice been ascertained that the described invention achieves the intended objects, and in particular the fact is emphasized that the machine for welding profiled elements made of plastic material according to the invention allows reducing the times related to the production of windows and doors, especially of complex windows and doors, that is, already provided with the central panel coming out of the machine and/or with one or more transverse profiled elements.

Moreover, this machine is characterized by extremely small dimensions and is structurally simple.

The invention claimed is:

1. A machine (1) for welding profiled elements made of plastic material, comprising:
   at least one supporting base (2);
   at least one main welding device (3) of at least a first profiled element (4) and at least a second profiled element (5) which extend along their respective longitudinal directions and are each provided with at least one external area to be welded (6) substantially inclined by an angle comprised between 10° and 80° with respect to said respective longitudinal direction, said main welding device (3) comprising:
      at least one main frame (14) associated with said supporting base (2);
      main retaining means (18, 19) adapted to retain said profiled elements (4, 5) with said external areas to be welded (6) facing each other;
      main heating means (20) associated with said main frame (14) and adapted to heat said external areas to be welded (6);
      main displacement means (21) of said main retaining means (18, 19) adapted to displace said profiled elements (4, 5) between a mutual spacing away position and a mutual approaching position, in which said heated external areas to be welded (6) are joined together;
wherein said main heating means (20) comprise two heating plates (27), each of which can be placed in contact with a respective external area to be welded (6) and arranged substantially parallel to each other at a predefined distance to define a free volume (V) positioned between said heating plates (27).

2. The machine (1) according to claim 1, wherein said main heating means (20) comprise a movement system (28, 29) of said heating plates (27) between a home position in which said heating plates (27) are moved away from said external areas to be welded (6) and a working position in which said heating plates (27) are placed between said external areas to be welded (6).

3. The machine (1) according to claim 2, wherein said movement system (28, 29) comprises at least one unit of forward movement (28) adapted to move said heating plates (27) along a working direction (L) substantially horizontal between said home position and said working position and comprising:
   at least one supporting frame (30) of said heating plates (27);
   at least one guidance assembly (31) extending along said working direction (L) and supporting in a sliding manner said supporting frame (30); and
   at least one actuator assembly (32) associated with said supporting frame (30) and adapted to move said heating plates (27) along said working direction (L).

4. The machine (1) according to claim 3, wherein said movement system (28, 29) comprises at least one sliding assembly (29) adapted to move said heating plates (27) along a transfer direction (C) substantially vertical between said home position and said working position and comprising:
   at least one holding structure (35) supporting said guidance assembly (31);
   at least one guidance unit (36) associated with said main frame (14), extending along said transfer direction (C) and supporting in a sliding manner said holding structure (35);
   at least one actuating unit (37) associated with said holding structure (35) and adapted to move said heating plates (27) along said transfer direction (C).

5. The machine (1) according to claim 1, wherein said main welding device (3) comprises at least one containment element (54) positioned between said heating plates (27) and adapted to abut on at least one perimeter edge of said external areas to be welded (6) to contain a welding bead.

6. The machine (1) according to claim 5, wherein said containment element (54) is movable along a substantially horizontal operational direction (W) between a home position, in which said containment element (54) is moved away from said profiled elements (4, 5) and in which said containment element (54) is placed at least partly inside said free volume (V), and an operational position, in which said containment element (54) contacts said profiled elements (4, 5) to contain said welding bead and in which said containment element (54) is placed outside said free volume (V).

7. The machine (1) according to claim 6, wherein said main welding device (3) comprises at least one movement unit (55) of said containment element (54) between said home position and said operational position, arranged at least partly inside said free volume (V).

8. The machine (1) according to claim 7, wherein said movement unit (55) comprises:
- at least one holding body (56) of said containment element (54) extending along said operational direction (W);
- at least one guidance system (561) supporting in a sliding manner said holding body (56);
- at least one actuating device (57) associated with said holding body (56) and adapted to move said containment element (54) along said operational direction (W).

9. The machine (1) according to claim 8, wherein said main heating means (20) comprise a movement system (28, 29) of said heating plates (27) between a home position in which said heating plates (27) are moved away from said external areas to be welded (6) and a working position in which said heating plates (27) are placed between said external areas to be welded (6), wherein said movement system (28, 29) comprises at least one unit of forward movement (28) adapted to move said heating plates (27) along a working direction (L) substantially horizontal between said home position and said working position and comprising:
- at least one supporting frame (30) of said heating plates (27); at least one guidance assembly (31) extending along said working direction (L) and supporting in a sliding manner said supporting frame (30); and
- at least one actuator assembly (32) associated with said supporting frame (30) and adapted to move said heating plates (27) along said working direction (L);
and wherein said guidance system (561) is associated with said supporting frame (30), said actuator assembly (32) being further adapted to move said containment element (54) along said operational direction (W) to exert a pressing force on said profiled elements (4, 5).

10. The machine (1) according to claim 9, wherein said movement unit (55) comprises a clamping system (58) adapted to keep said containment element (54) in said operational position.

11. The machine (1) according to claim 10, wherein said clamping system (58) comprises:
- at least one slot (59) defined on said holding body (56) at an opposite end to said containment element (54);
- at least one securing pin (60) associated movable with said supporting frame (30), movable to engage with said slot (59) and prevent said holding body (56) from sliding on said guidance system (561).

12. The machine (1) according to claim 3, wherein said main welding device (3) comprises main cooling means (62) associated with said supporting frame (30) and adapted to cool said free volume (V).

13. The machine (1) according to claim 12, wherein said main cooling means (62) comprise:
- at least one cooling casing (63) associated with one of said heating plates (27) inside said free volume (V) and defining an inner tube (63a); and
- at least one suction assembly (64) connected in a fluid-operated manner to said cooling casing (63) and adapted to suck air through said inner tube (63a).

14. The machine (1) according to claim 1, wherein said machine (1) comprises at least one intermediate welding device (7) adapted to weld said first profiled element (4) to a transverse profiled element (8), provided with at least one intermediate area to be welded (10) and with one transverse area to be welded (9) respectively, said intermediate welding device (7) comprising:
- at least one intermediate frame (16) associated with said supporting base (2);
- intermediate retaining means (65a, 65b) adapted to retain said profiled elements (4, 8) with said areas to be welded (9, 10) facing each other;
- at least one heating unit (73) adapted to heat said areas to be welded (9, 10) and comprising:
  - at least one heating body (77) with electric resistance; and
  - at least one removable covering body (78a, 78b), arranged so as to wind said heating body (77) and shaped to adapt to the conformation of said first profiled element (4) and of said transverse profiled element (8);
- intermediate displacement means (67) of said intermediate retaining means (65a, 65b) adapted to mutually displace said profiled elements (4, 8) between a moving away position and an approaching position, in which said heated areas to be welded (9, 10) are joined to each other.

15. The machine (1) according to claim 14, wherein that said heating unit (73) is movable between:
- an active condition, in which said heating unit (73) is positioned between said first profiled element (4) and said transverse profiled element (8) to heat and melt at least partly said areas to be welded (9, 10); and
- a home condition, in which said heating unit (73) is moved away from said first profiled element (4) and from said transverse profiled element (8) to allow the joining of the profiled elements (4, 8);
in said home condition, said heating unit (73) being arranged below said intermediate retaining means (65a, 65b).

16. The machine (1) according to claim 15, wherein said intermediate welding device (7) comprises intermediate cooling means (79) adapted to cool said intermediate retaining means (65a, 65b) by overheating caused by said heating unit (73).

* * * * *